United States Patent
Shukla et al.

(10) Patent No.: US 10,923,915 B2
(45) Date of Patent: Feb. 16, 2021

(54) SYSTEM AND METHOD FOR CONGESTION FORECASTING IN ELECTRICAL NETWORKS

(71) Applicant: Utopus Insights, Inc., Valhalla, NY (US)

(72) Inventors: Srivats Shukla, Elmsford, NY (US); Mark Gang Yao, Hicksville, NY (US); Mark A. Lavin, Katonah, NY (US); Ronald Ambrosio, Poughquag, NY (US)

(73) Assignee: Utopus Insights, Inc., Valhalla, NY (US)

( * ) Notice: Subject to any disclaimer, the term of this patent is extended or adjusted under 35 U.S.C. 154(b) by 220 days.

(21) Appl. No.: 15/920,334

(22) Filed: Mar. 13, 2018

(65) Prior Publication Data

US 2019/0288514 A1 Sep. 19, 2019

(51) Int. Cl.
*H02J 3/38* (2006.01)
*G05B 15/02* (2006.01)
*H02J 3/00* (2006.01)

(52) U.S. Cl.
CPC .............. *H02J 3/382* (2013.01); *G05B 15/02* (2013.01); *H02J 3/003* (2020.01); *H02J 2203/20* (2020.01)

(58) Field of Classification Search
CPC ........ H02J 3/382; H02J 3/003; H02J 2203/20; G05B 15/02
USPC ......................................................... 703/18
See application file for complete search history.

(56) References Cited

U.S. PATENT DOCUMENTS

| 2001/0021896 | A1 | 9/2001 | Bertsch | |
|---|---|---|---|---|
| 2010/0094477 | A1 | 4/2010 | Berggren | |
| 2011/0307109 | A1* | 12/2011 | Sri-Jayantha | G06Q 10/04 700/291 |
| 2012/0022713 | A1 | 1/2012 | Deaver, Sr. | |
| 2012/0065788 | A1* | 3/2012 | Harper, III | G06N 7/005 700/291 |

FOREIGN PATENT DOCUMENTS

CN 206364519 U * 7/2017

OTHER PUBLICATIONS

International Application No. PCT/US2019/021922, International Search Report and Written Opinion dated Jul. 5, 2019.
(Continued)

*Primary Examiner* — Justin C Mikowski
(74) *Attorney, Agent, or Firm* — Ahmann Kloke LLP

(57) ABSTRACT

An example method comprises receiving an initial topology of an electrical, receiving a selection of a region of interest, determining one or more external equivalents of the electrical network that are external to the region of interest, determining one or more internal equivalents of the region of interest, calculating a sensitivity matrix based on electrical impedances of at least one of the one or more internal equivalents and based on an amount of power exchanged when in operation, determining a subset of the sensitivity matrix as indicating highly sensitive buses, receiving historical data regarding power flows, predicting power flow for each highly sensitive buses, comparing the predicted power flow to at least one predetermined threshold to determine possible network congestion, and generating a report regarding network congestion and locations of possible network congestion in the region of interest based on the comparison.

19 Claims, 10 Drawing Sheets

(56) References Cited

OTHER PUBLICATIONS

Chertkov, Michael et al., "Predicting Failures in Power Grids: The Case of Static Overloads," Sep. 15, 2010 [retrieved online at https://arxiv.org/pdf/1006.0671.pdf on Oct. 1, 2019].
Zhou, Qun et al. "Short-Term Congestion Forecasting in Wholesale Power Markets," Jul. 2010 (revised Jan. 2011) [retrieved online at https://www.researchgate.net/publication/46434751_Short_Term_Congestion_Forecasting_in_Wholesale_Power_Markets/download on Oct. 1, 2019].

* cited by examiner $$\begin{bmatrix} \text{Path}_j \\ - \\ \text{Path}_k \end{bmatrix} = \begin{bmatrix} \text{Injection - 1 sens. to path } j & \cdots & \text{Injection - n sens. to path } j \\ & \cdots & \\ \text{Injection - 1 sens. to path } k & \cdots & \text{Injection - n sens. to path } k \end{bmatrix} \begin{bmatrix} P_1 \\ - \\ P_n \end{bmatrix}$$

FIG. 7

SYSTEM AND METHOD FOR CONGESTION FORECASTING IN ELECTRICAL NETWORKS

FIELD OF THE INVENTION

Embodiments of the present invention(s) relate generally to forecast congestion in electrical networks. In particular, the present invention(s) relate to forecasting congestion in electrical networks by reducing complexity of the network and utilizing historical data to create a model to forecast congestion to enable proactive solutions.

DESCRIPTION OF RELATED ART

When an asset of an electrical network is overloaded, the asset (and perhaps the network) is congested. A path (or a collection of conductors) within the electrical network of a power company is congested when one or multiple current-carrying elements (e.g., conductors, transformers, AC lines, and the like) are operationally carrying an amount of power which exceeds a specific threshold, for a specific time-period.

Upon detection of existing congestion on an electrical network, transmission utilities typically undertake congestion mitigation steps, as opposed to congestion forecasting and proactive congestion management or congestion avoidance. Congestion control approaches are, at present, rarely proactive, and utilities react to congestion using after-the-fact mechanisms such as re-dispatch and controlling line flows by using phase-shifting transformers. Utilities approach unknown future congestion by simply oversizing conductors which is not economical. Power companies do not adopt proactive congestion management for many reasons including:
1. simulations require accurate internal and external network models and wide-range of scenarios which are rarely available, expensive to create, and computationally expensive;
2. planning approaches using AC power flow with Monte-Carlo simulation adopt high dimensional models and are computationally inefficient, thus rendering them inefficient for real-time congestion forecasting;
3. presence of renewable energy generation exacerbates problem;
4. bottlenecks often exist on external network models and acquisition of hyperlocal weather forecast information; and/or
5. data-only approaches that use line-flow forecasts trained on only historical measurements are not accurate due to overfitting on available features and the absence of the capability to process network topology.

SUMMARY

An example nontransitory computer readable medium comprises instructions executable by a processor. The instructions may be executable to perform a method. The method comprises receiving an initial topology of electrical network of electrical assets, the electrical network for receiving and providing electrical power to infrastructure, receiving a selection of a region of interest of the initial topology of the electrical network of electrical assets, determining one or more external equivalents of two or more electrical assets of the initial topology of the electrical network that are external to the region of interest, determining one or more internal equivalents of two or more electrical assets of the initial topology of the electrical network that are internal to the region of interest, calculating a sensitivity matrix based on electrical impedances of at least one of the one or more internal equivalents within the region of interest and based on an amount of power exchanged by the one or more internal equivalents within the region of interest when in operation, determining a subset of the sensitivity matrix as indicating highly sensitive buses, each of the highly sensitive buses in the region of interest being sensitive to power flow in comparison with other nodes in the sensitivity matrix, receiving historical data regarding power flows of any number of nodes of the region of interest, predicting power flow for each highly sensitive buses based on the historical data, comparing the predicted power flow for each of the highly sensitive buses to at least one predetermined threshold to determine possible network congestion, and generate a report regarding network congestion and locations of possible network congestion in the region of interest based on the comparison.

In various embodiments, the method further comprises receiving a weather prediction associated with a geographic area that includes renewable energy sources and wherein predicting the power flow for each of the highly sensitive buses is further based on predicted power injections related to the weather prediction. In some embodiments, the method may further comprise receiving historical data regarding power flows of any number of the one or more external equivalents external to the region of interest and wherein predicting power flow for each of the highly sensitive buses is further based on power injections associated with the one or more external equivalents that are predicted based on the historical data regarding power flows of the any number of the one or more external equivalents.

The sensitivity matrix may produce linear coefficients. The sensitivity matrix may be linearized once for one topology of the region of interest. In some embodiments, each new predicted injection requires a multiplication of the sensitivity matrix with the predicted injection and not an inversion. The sensitivity matrix may be inverted upon a change of topology of the region of interest.

The method may further comprise simplifying the topology of the region of interest by closing circuit breakers in the topology. Calculating the sensitivity matrix based on the electrical impedances of at least one of the one or more internal equivalents within the region of interest may comprise calculating electrical distance between the at least one of the one or more internal equivalents within the region of interest to a source of power injection. Calculating the sensitivity matrix may also be based on electrical impedances of at least one node within the region of interest, the node representing an asset of the region of interest in the electrical grid.

An example system comprises one or more processors and memory. The memory may comprise instructions to configure the one or more processors to perform a method. The method may comprise receiving an initial topology of electrical network of electrical assets, the electrical network for receiving and providing electrical power to infrastructure, receiving a selection of a region of interest of the initial topology of the electrical network of electrical assets, determining one or more external equivalents of two or more electrical assets of the initial topology of the electrical network that are external to the region of interest, determining one or more internal equivalents of two or more electrical assets of the initial topology of the electrical network that are internal to the region of interest, calculating a sensitivity matrix based on electrical impedances of at least one of the one or more internal equivalents within the region of interest and based on an amount of power exchanged by the one or more internal equivalents within the region of interest when in operation, determining a subset of the sensitivity matrix as indicating highly sensitive buses, each of the highly sensitive buses in the region of interest being sensitive to power flow in comparison with other nodes in the sensitivity matrix, receiving historical data regarding power flows of any number of nodes of the region of interest, predicting power flow for each highly sensitive buses based on the historical data, comparing the predicted power flow for each of the highly sensitive buses to at least one predetermined threshold to determine possible network congestion, and generate a report regarding network congestion and locations of possible network congestion in the region of interest based on the comparison.

In various embodiments, the method further comprises receiving a weather prediction associated with a geographic area that includes renewable energy sources and wherein predicting the power flow for each of the highly sensitive buses is further based on predicted power injections related to the weather prediction. In some embodiments, the method may further comprise receiving historical data regarding power flows of any number of the one or more external equivalents external to the region of interest and wherein predicting power flow for each of the highly sensitive buses is further based on power injections associated with the one or more external equivalents that are predicted based on the historical data regarding power flows of the any number of the one or more external equivalents.

The sensitivity matrix may produce linear coefficients. The sensitivity matrix may be linearized once for one topology of the region of interest. In some embodiments, each new predicted injection requires a multiplication of the sensitivity matrix with the predicted injection and not an inversion. The sensitivity matrix may be inverted upon a change of topology of the region of interest.

The method may further comprise simplifying the topology of the region of interest by closing circuit breakers in the topology. Calculating the sensitivity matrix based on the electrical impedances of at least one of the one or more internal equivalents within the region of interest may comprise calculating electrical distance between the at least one of the one or more internal equivalents within the region of interest to a source of power injection. Calculating the sensitivity matrix may also be based on electrical impedances of at least one node within the region of interest, the node representing an asset of the region of interest in the electrical grid.

An example method may comprise receiving an initial topology of electrical network of electrical assets, the electrical network for receiving and providing electrical power to infrastructure, receiving a selection of a region of interest of the initial topology of the electrical network of electrical assets, determining one or more external equivalents of two or more electrical assets of the initial topology of the electrical network that are external to the region of interest, determining one or more internal equivalents of two or more electrical assets of the initial topology of the electrical network that are internal to the region of interest, calculating a sensitivity matrix based on electrical impedances of at least one of the one or more internal equivalents within the region of interest and based on an amount of power exchanged by the one or more internal equivalents within the region of interest when in operation, determining a subset of the sensitivity matrix as indicating highly sensitive buses, each of the highly sensitive buses in the region of interest being sensitive to power flow in comparison with other nodes in the sensitivity matrix, receiving historical data regarding power flows of any number of nodes of the region of interest, predicting power flow for each highly sensitive buses based on the historical data, comparing the predicted power flow for each of the highly sensitive buses to at least one predetermined threshold to determine possible network congestion, and generate a report regarding network congestion and locations of possible network congestion in the region of interest based on the comparison.

BRIEF DESCRIPTION OF THE DRAWINGS

FIG. 7 depicts an example structure of the sensitivity matrix, where $Path_x$ represents a particular line flow.

DETAILED DESCRIPTION

Congestion occurs in electrical networks when there is insufficient power to meet the demands of all the customers. Congestion might result in damage of conductors leading to wide spread power outages, lead to loss of revenue due to less than expected energy sales, risk health of assets of the electrical grid, risk property of others that depend upon energy, and risk life of others that may depend upon energy (e.g., health care devices, the elderly in their homes during heat waves, and the like). Further, electrical congestion appears to be increasing year-to-year due to climate change.

Figure 1:
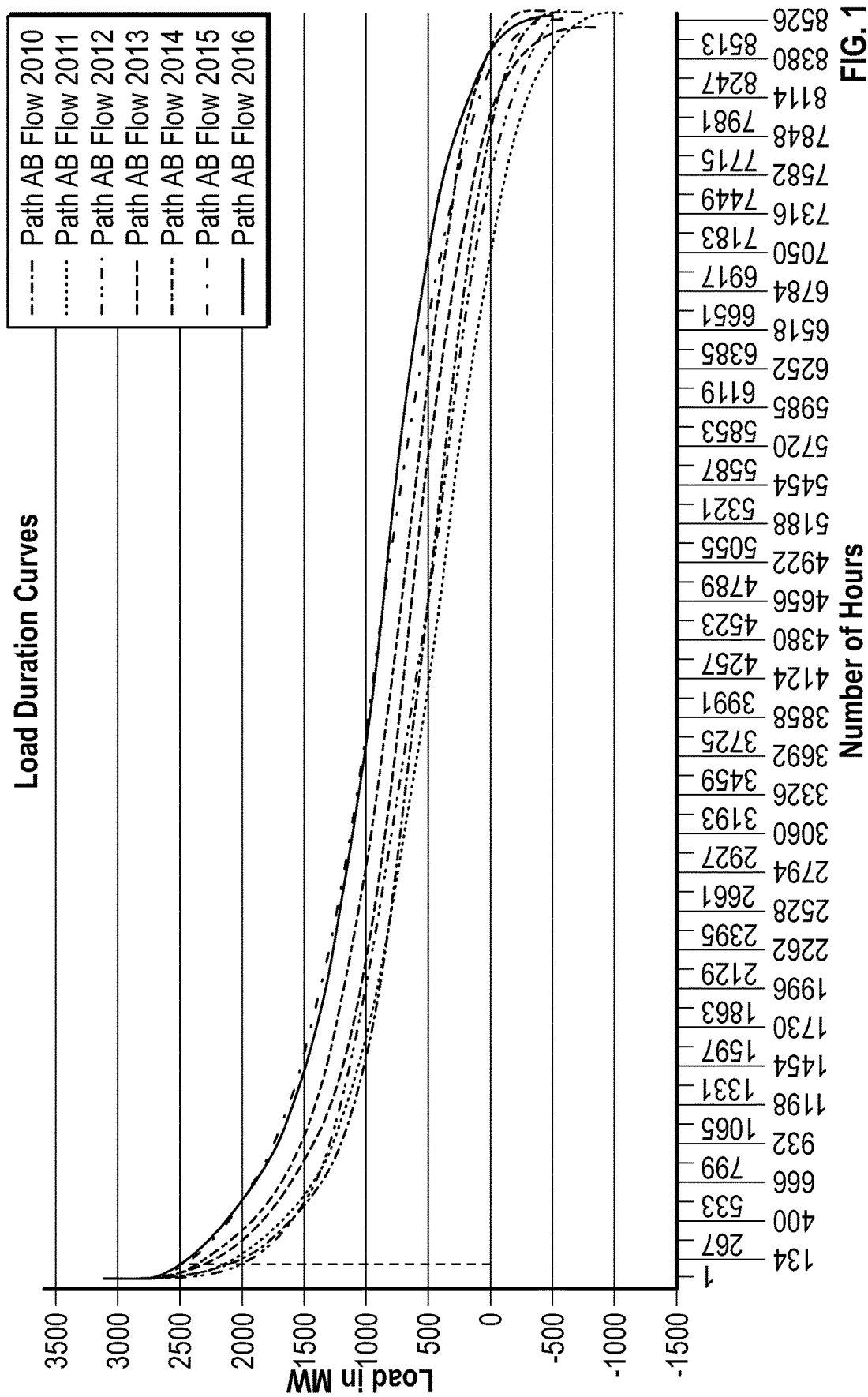
FIG. 1 is an example of congestion metrics from one utility.

FIG. 1 is an example of congestion metrics from one utility. The vertical axis depicts load in MW and the horizontal axes represents number of hours. Each line represents different path flow for a different year.

At least some embodiments described herein discuss approaches for prediction (i.e., forecast) of network congestion on an electrical network before the congestion occurs. Some embodiments discussed herein include real-time congestion-forecasting on a pre-specified path within an electrical network of a power company. By utilizing this approach, utilities and power companies may prevent power outages, damages to assets, and/or related loss of property and life that may critically depend upon electricity (e.g., hospitals, homes of the elderly, and the like).

In some embodiments include the following components: (i) a process to reduce dimensionality of the network to be modeled based on the identified subset of buses, (ii) a process for identifying a subset of buses of the electrical network that have a high influence on the network, and (iii) a computationally efficient process which predicts the congestion in paths of interest by multiplying power injections at the identified influential buses with a linearized sensitivity matrix. In various embodiments, the system may be capable of processing real-time network topology (breaker statuses) and the forecasted (or measured or estimated) power injections at influential nodes in the electrical network.

Figure 2:
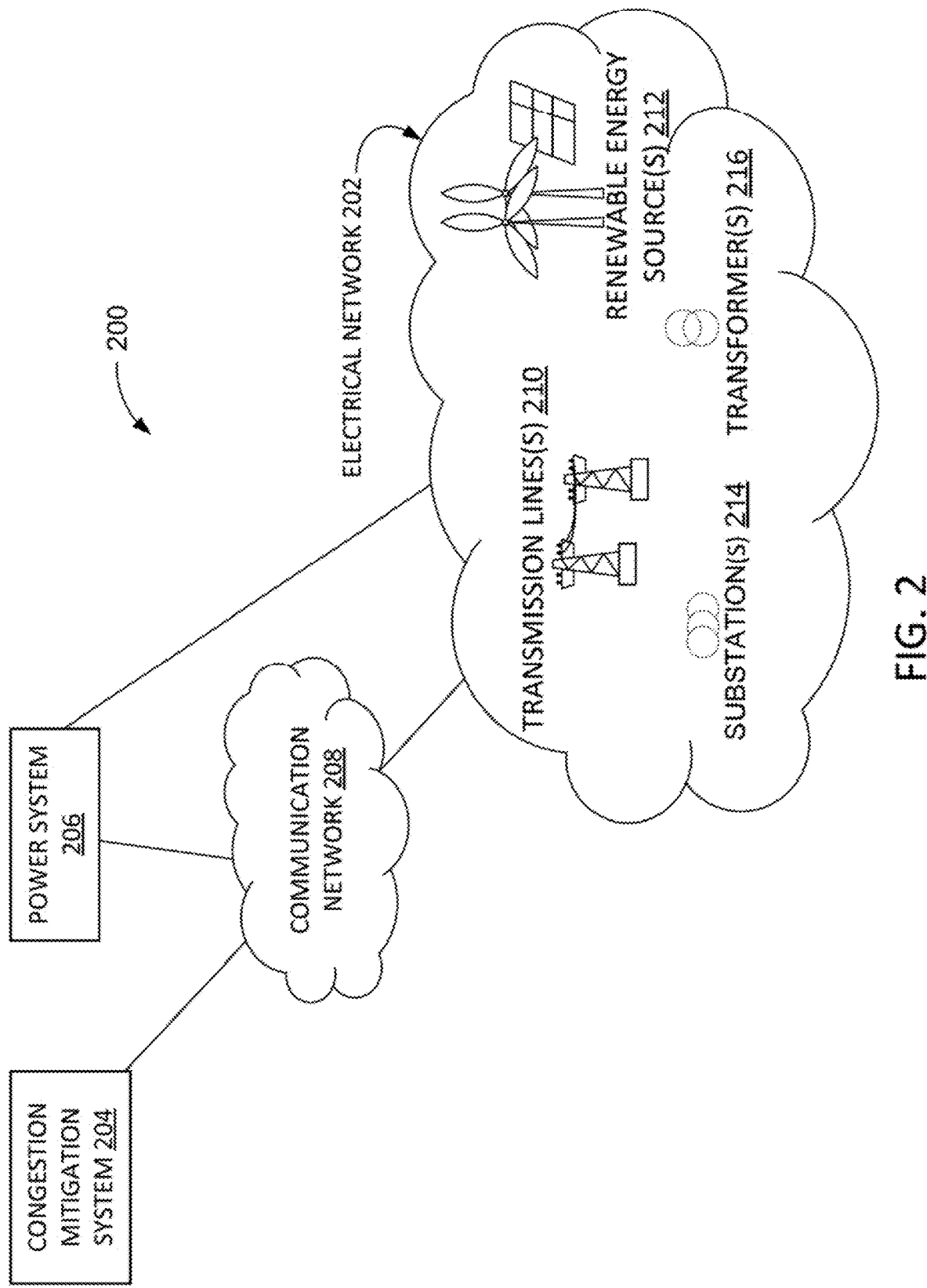
FIG. 2 depicts a block diagram of an example of an electrical network in some embodiments.

FIG. 2 depicts a block diagram 200 of an example of an electrical network 200 in some embodiments. FIG. 2 includes an electrical network 202, a congestion mitigation system 204, a power system 206, in communication over a communication network 208. The electrical network 202 includes any number of transmission lines 210, renewable energy sources 212, substations 214, and transformers 216. The electrical network 202 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 202 such as the transmission line(s) 210, the renewable energy source(s) 212, substation(s) 214, and/or transformer(s) 206 may inject energy or power (or assist in the injection of energy or power) into the electrical network 202. Each component of the electrical network 202 may be represented by any number of nodes in a network representation of the electrical network. Renewable energy sources 212 may include solar panels, wind turbines, and/or other forms of so called "green energy." The electrical network 202 may include a wide electrical network grid (e.g., with 40,000 assets or more).

Each component of the electrical network 200 may represent one or more elements of their respective components. For example, the transformer(s) 216, as shown in FIG. 2 may represent any number of transformers which make up electrical network 200.

In some embodiments, the congestion mitigation system 204 provides real-time congestion-forecasting on any number of path(s) (or path equivalents) of the electrical network 202 to the power system 206. The congestion mitigation system 204 may identify a bus, path, and/or combination of assets of the electrical network 202 which have a significant influence on congestion as a path of interest. In various embodiments, the congestion mitigation system 204 may compute power flow on the identified bus, path, and/or combination of assets of the electrical network 202. The congestion mitigation system 204 may compare the computed power flow to thresholds (e.g., which may be pre-set by the power system 206) to assist in forecasting congestions.

In some embodiments, communication network 208 represents one or more computer networks (e.g., LAN, WAN, and/or the like). Communication network 208 may provide communication between any of the congestion mitigation system 204, the power system 206, and/or the electrical network 202. In some implementations, communication network 208 comprises computer devices, routers, cables, uses, and/or other network topologies. In some embodiments, communication network 208 may be wired and/or wireless. In various embodiments, communication network 208 may comprise the Internet, one or more networks that may be public, private, IP-based, non-IP based, and so forth.

The congestion mitigation system 204 may include any number of digital devices configured to forecast congestion of all or part of the electrical network 202 (e.g., electrical grid). In various embodiments, the congestion mitigation system 204 may reduce computational burden of forecasting congestion by creating a reduced sensitivity matrix to identify highly influential buses in the electrical network 202. The congestion mitigation system 204 may simplify external network modeling by using any number of external equivalents and/or may utilize uncertainty bounds on injections with partial information.

Using historical data of measured power injection data and weather forecasts, the congestion mitigation system 204 may forecast congestion of the identified highly influential buses. In one example, the congestion mitigation system 204 may forecast congestion up through the next 3 hours, 6 hours, 8 hours, 12 hours, 16 hours, 20 hours, 24 hours, 28 hours, 32 hours, 36 hours, 40 hours, 44 hours, 48 hours, or more. It will be appreciated that the system is not limited to forecasting only the examples above, but may be any amount of time.

The power system 206 may include any number of digital devices configured to control distribution and/or transmission of energy. The power system 206 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 8.

Figure 3:
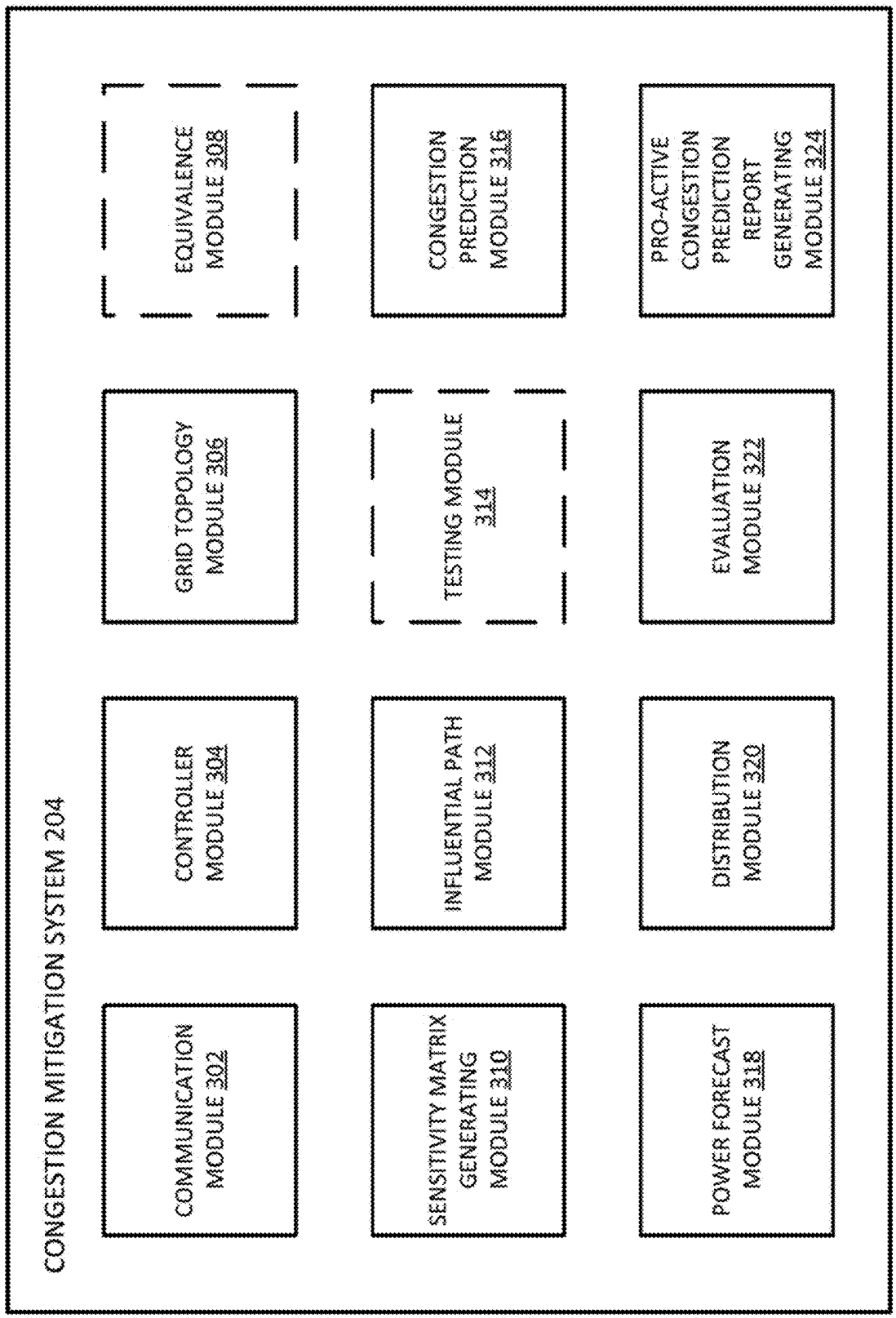
FIG. 3 depicts a block diagram of an example of the congestion mitigation system according to some embodiments.

FIG. 3 depicts a block diagram of an example of the congestion mitigation system 204 according to some embodiments. The congestion mitigation system 204 includes a communication module 302, a controller module 304, a grid topology module 306, an equivalence module 308, a sensitivity matrix generating module 310, an influential path module 312, a testing module 314, a congestion prediction module 316, a power forecast module 318, a distribution module 320, an evaluation module 322 and a pro-active congestion prediction report generating module 324. A module may be hardware, software, or a combination of both.

In various embodiments, the congestion mitigation system 204: (1) simplifies a model of the electrical network 202 and/or identifies a subset of buses which have a high influence on congestion and their related sensitives; (2) creates power injection forecasts based on previously identified influential internal and/or external buses; (3) predicts congestion in the path of interest by processing real-time network information (e.g., breaker statuses) and the forecast (or measured or estimated) power injections at the identified influential buses; and (4) provides the prediction (i.e., a forecast) to manage the electrical network 202 to control and direct power to avoid or reduce predicted congestion. In various embodiments, the congestion mitigation system 204 utilizes weather forecasts (e.g., hyperlocal weather forecasts) in geographic regions including renewable energy sources 212 (e.g., wind farms and/or solar panel areas) to predict power generation and injection(s) of the predicted power from the renewable energy sources 212 into the electrical network 202 and/or subset of buses. In various embodiments, hyperlocal weather forecasts may include highly localized or meso-scale weather forecasts. In one example, a hyperlocal weather forecast may include a high-resolution weather forecasts with resolution up to 3 km-grids.

The communication module 302 may be configured to transmit and receive data between two or more modules in congestion mitigation system 204. In some embodiments, the communication module 302 is configured to receive information regarding assets of the electrical network 202 (e.g., from the power system 206, sensors within components of the electrical network 202, third-party systems such as government entities, other utilities, and/or the like).

In some embodiments, the controller module 304 is configured to manage one or more of the various modules shown in FIG. 3. For example, controller module 304 may control the grid topology module 306 to generate and/or receive an initial model of the electrical network 202 (e.g., based in part on information received from the power system 206), control the equivalence module 308 to determine and generate equivalent portions of the electrical network 202 and/or otherwise simply the model, control the sensitivity matrix generating module 310 to generate the sensitivity matrix generating module 310, control the influential path module 312 to identify influential buses and/or paths for the model using the sensitivity matrix, control the testing module 314 to test optionally test the sensitivity matrix and/or influential buses/paths for validity, to control the congestion prediction module 316 to predict or forecast congestion based on predicted power injections, control the power forecast module 318 to forecast power of renewable energy sources using weather forecasts, control the distribution module 320 to assist in creating or receiving probability distributions for power injections, control the evaluation module 322 to evaluate predictions of network congestion, and control the pro-active congestion prediction report generation module 324 to generate the pro-active congestion prediction report to forecast congestion for all or part of the electrical network 202 using the models and power predictions.

The grid topology module 306 may determine and/or receive a topology of the electrical network 202. In some embodiments, one or more of the components (e.g., assets) of the electrical network 202 in FIG. 2 may be represented in a grid topology as a node. The connection between these nodes may be represented in the grid topology as branches. In various embodiments, the grid topology module 306 may represent branches and nodes in a matrix form. In one example, the grid topology module 306 may determine the topology of a subset of the electrical network 202. A topology structure of the electrical network 202 or a subset of the electrical network with "n" nodes and "b" branches can be indicated by an "n"×"b" matrix. Row vectors of the matrix correspond to the nodes while column vectors of the matrix may correspond to the branches of the electrical network 202.

In some embodiments, the grid topology module 306 may receive an initial topology of an electrical grid from the power system 206. The grid topology module 306 (or a user through the controller module 304) may select a portion of the electrical grid to create the topology of the electrical network 202. In one example, the grid topology module 306 may receive a grid topology of a large number of assets (e.g., 40,000 or more). The grid topology module 306 may select a subset or portion of the original grid topology for congestion prediction.

In various embodiments, the grid topology module 306 may receive an indication of a region of interest (ROI) of the electrical network for congestion analysis. In some embodiments, the indication of a ROI of the electrical network may be received from a user, the power system 202, and/or any digital device. Once an ROI is determined, the grid topology module 306 may identify portions (e.g., assets and buses) of the electrical network external to the ROI and/or portions (e.g., assets and buses) of the electrical network internal to the ROI.

The grid topology module 306 may, in some embodiments, convert all or part of the topology received from the power system 206 to a different topology (e.g., from a topological map received from the power system 206 to the matrix form discussed herein).

The equivalence module 308 may be configured to simplify the grid topology of the electrical network 202 (e.g., simplify the initial grid topology generated and/or received by the grid topology module 306). In various embodiments, the equivalence module 308 may simplify assets and/or paths to equivalent nodes (e.g., Thevenin equivalent) and update the grid topology model.

Components of the electrical network 202 positioned outside (i.e., that are external to) a particular subset of the electrical network 202 may be reduced to a respective external node or reduced to create multiple different equivalences of the external nodes. For example, nodes which are external to the subset of the electrical network 202 may be reduced to one or more external node equivalences. External nodes, in some embodiments, may be reduced according to directional placement of the nodes. In one example, geographic coordinates or labels may be used to create different external nodes. For example, the equivalence module 308 may determine one or more equivalent nodes for assets to the North of the region of interest in order to better predict power injections and their influences on the region of interest. Similarly, the equivalence module 308 may determine one or more equivalent nodes for electrical assets to the South, East, West, SouthEast, NorthWest, or the like for power injection prediction. It will be appreciate that the equivalence module 308 may group any number of nodes and/or buses external to the region of interest in any number of ways. It will be appreciated that not all nodes that are external to the region of interest may be part of an equivalent system.

Figures 9A, 9B:
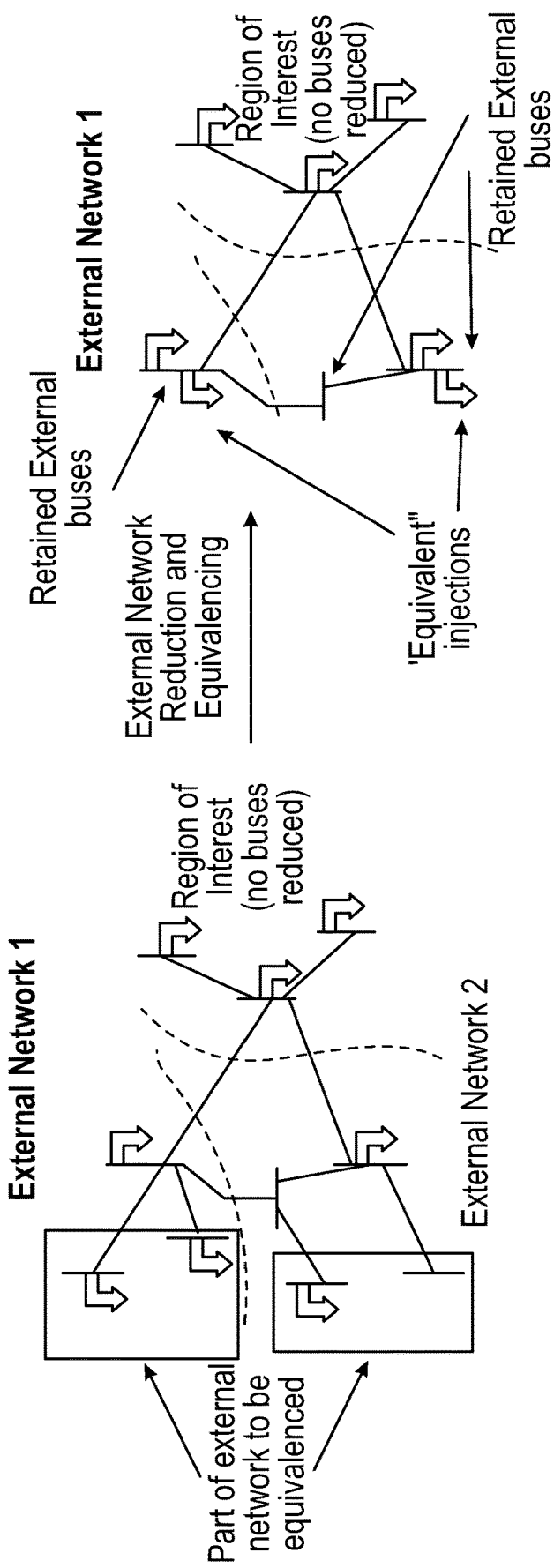
FIG. 9A depicts an example external area that is divided in several regions and the boundary buses between external regions.
FIG. 9B depicts an example of reducing buses that are not at the boundaries but within the external regions.

In some embodiments, the equivalence module 308 creates equivalents while keeping buses at a boundary between the region of interest, and external regions intact. FIG. 9A depicts an example external area that is divided in several regions (based on utility, Independent System Operator and the geographic boundaries). The boundary buses between external regions are retained while creating equivalents in this example. The equivalence module 308 may divide the regions, FIG. 9B depicts an example of reducing buses that are not at the boundaries but within the external regions. The equivalence module 308 may reduce buses which are not at the boundaries but within the external regions by attaching the 'equivalent' injections at the buses which are retained.

In some embodiments, the equivalence module 308 reduces one or more internal nodes into one or more internal node equivalences. In determining equivalences, the equivalence module 308 may simply the topology and/or model by closing one or more (e.g., all) closed circuit breakers and opening all open buses and the like of model topology of the electrical network 202. Similarly, the grid topology module 306 may reduce one or more internal nodes into one or more internal node equivalences. It will be appreciated that the equivalence module 308 may be optional.

The equivalence module 308 and/or any module of the congestion mitigation system 204 may receive or determine equivalence for impedance for any external or internal equivalence as needed (e.g., based on impedance, voltage, current, power, and/or other indications associated with an asset or group of assets of the electrical network 202).

The sensitivity matrix generating module 310 may be configured to generate a sensitivity matrix that may be used for determining network buses which have a significant influence on power flows in electrical network 202 (e.g., or a subset or identified portion of the electrical network 202). In various embodiments, the sensitivity matrix may utilize impedance (e.g., electrical distances) of any number of in the electrical network 202. The sensitivity matrix is further described in FIG. 6.

In various embodiments, the sensitivity matrix generating module 310 generates a sensitivity matrix based in part on the regions of interest (ROI) of the electrical network 202, equivalents, and/or the model generated by the grid topology module 306. The sensitivity matrix generating module 310 generates the sensitivity matrix based on impedance of the nodes of the ROI in the electrical network 202 and significance of node/buses in terms of amount of power being exchanged by that node in operation. In various embodiments, impedance information regarding one or more nodes may be received from the power system 206, user, and/or any number of sources.

Figure 6:
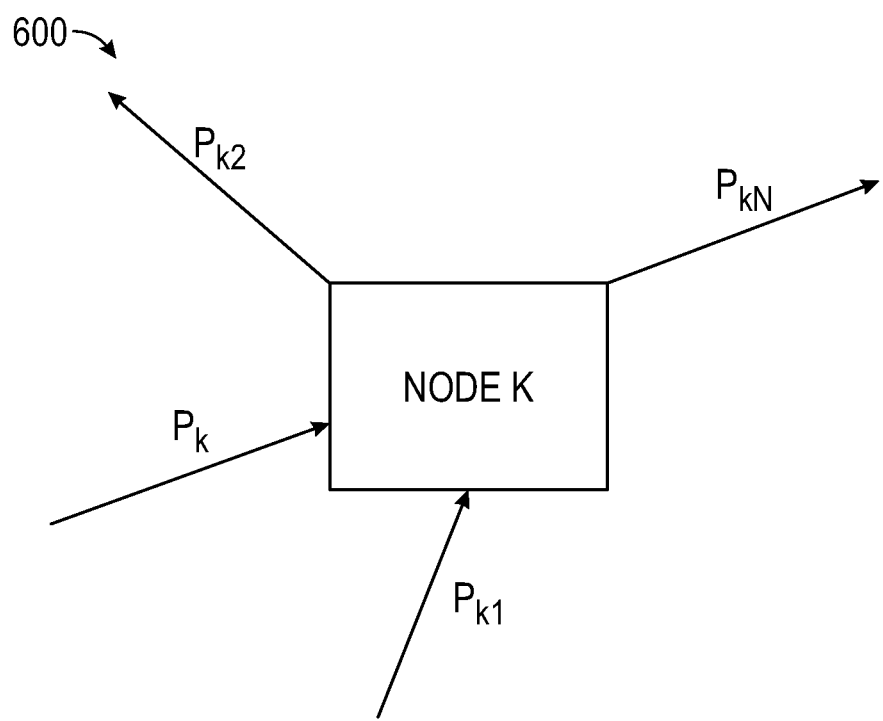
FIG. 6 depicts power flows associated with a particular node of a region of interest of an electrical grid for discussing the sensitivity matrix in some embodiments.

The determination of the sensitivity matrix is further discussed with regard to FIG. 6.

The influential path module 312 may utilize the sensitivity matrix to further simply the region of interest and identify one or more buses which have a high influence on congestion and related sensitivities (e.g., one or more paths which have influence on the flows in the path of interest). The determination and/or identification of one or more paths of interest is further discussed with regard to FIG. 7 which depicts the structure of the sensitivity matrix.

In some embodiments, the influential path module 312 is configured to determine paths of the electrical network 202 that have a high influence on congestion, or are most susceptible to congestion. The susceptibility of a node of the electrical network 202 may be dependent on factors such as an amount of power which passes through the node. The influential sensitivity matrix may be a subset of the sensitivity matrix generated by the sensitivity matrix generating module 310.

The congestion prediction module 316 may create forecasts or predictions of power flows over the paths identified by the influential path module 312 as having a high influence on congestion. In various embodiments, the congestion prediction module 316 may receive a set of historical data including, in some embodiments, power injections of external and/or internal nodes (e.g., or node equivalents) as well as past outcomes indicated network congestion. The congestion prediction module 316 may utilize the historical data and past weather forecasts in conjunction with the sensitivity matrix associated with paths that have the highest influence on congestion.

In some embodiments, the power system 206 may provide historical data indicating power input into the system and/or any number of combination of assets of the region of interest of the electrical network 202. The historical data may, for example, include sensor readings and/or other data associated with any number of assets or combination of assets of the electrical grid. The historical data may also indicate congestion for the region of interest of the electrical network 202 and/or congestion for portions of the electrical network 202 (e.g., associated with paths of interest). Weather forecasts, including weather forecasts localized over one or more renewable energy sources 212, may also be used in conjunction with the historical data to predict network congestion and/or test network congestion predictions.

For example, power transmission/distribution companies (e.g., power systems 206) may gather power injection and power flow signals continuously through networked sensors and telemetry. A couple of examples of such systems include, but are not limited to, Phasor Measurement Units (PMUs) and SCADA (Supervisory Control and Data Acquisition Systems). Sampling intervals in this example may be in the range of few hundred milliseconds to few minutes. The collected data for several years may persist inside existing databases. In one of the example, the power system (s) 206 may provide measurements of power injections and power flows (for a certain subset of nodes) for the last 5 years, at 5 minute intervals.

The testing module 314 may, in some embodiments, test predictions using another portion of the historical data and may compare the output of the model against outcome (e.g., the presence of historical data) of that portion of the historical data (e.g., comparison of the output of the model to "ground truth") to test the model.

In some embodiments, the testing module 314 may be an optional module which compares the output of test data applied to the influential sensitivity matrix to historical congestion data to gauge the accuracy of the influential sensitivity matrix. The result of the testing module 314 may be a quantitative value which may be compared to a predetermined testing threshold to determine if the influential sensitivity matrix is inaccurate and if the influential path module 312 needs to recalculate the influential sensitivity matrix.

The power forecast module 318 may be configured to determine, a forecast (e.g., short-term forecast) of power injected into one or more nodes (e.g., each node) in or influencing the influential path of the electrical network 202. The power forecast module 318 may be configured to receive historical data of the power injection into the electrical network 202 by each node of the influential path, a weather forecast (e.g., short term and/or hyper localized), and/or schedule of upcoming component maintenance from each node of the influential path to determine a forecast of power for one or more nodes of the influential path. The historical data (e.g., received from the power system 206 and/or one or more components of the electrical network 202) may include past power injection information into the electrical network 202 by each node of the influential path.

In various embodiments, for a geographical region of the power company under consideration, weather data may be collected for same time horizon as the historical data (e.g., five years in the past) from either publicly available sources (e.g., National Weather Service) and/or obtained from the private information. A variety of weather features like temperature, humidity, precipitation, and the like may be collected for the given time frame. The list of such "interesting" features may be pre-determined by domain experts.

The weather forecast may affect the power injection from renewable energy sources 212, and may therefore have an effect on the power forecast. In some embodiments, historical data is not available for all the nodes of the influential path, in which case a probability distribution may be determined based on historical information, local assets of the electrical network 202, power consumption, power distribution data, and/or power injection data, by the distribution module 320, for each node of the influential path. In some embodiments, the power forecast module 318 determines a current state of each node of the influential path of the electrical network 202. The power forecast module 318 may use the data associated with the current state of each node of the influential path, the data associated with the short-term forecast of power export to external node equivalences and data associated with the short-term forecast of the power injection for each node in the influential path of the electrical network 202, combine the data with the influential sensitivity matrix to generate a forecasted influential sensitivity matrix.

The distribution module 320 may be configured to calculate a probability distribution of power injection for each node of the influential path. In some embodiments, the distribution module 320 is configured to calculate the probability distribution of power injection in the influential path. The distribution module 320 may, in some embodiments, determine a probability of power injections for building the sensitivity matrix (further discussed with regard to FIG. 6) and/or identifying influential paths (further discussed with regard to FIG. 7.

In various embodiments, the distribution module 320 may determine a probability of distribution of power injection based on information from a weather forecast, historical information, real time information regarding the electrical network 202, and/or information from the power system 204. The probability of distribution may be utilized in conjunction with the model to assist in forecasting congestion.

The evaluation module 322 may receive a congestion forecast from the model that predicts future congestion on one or more parts/regions of the electrical network 202. The evaluation module 322 may evaluate the future congestion by comparing the future congestion to one or more rules (e.g., thresholds) regarding acceptable and unacceptable amounts of network congestion. The rules and/or thresholds may be provided by a user, another digital device, and/or the power system 204.

In some embodiments, the evaluation module 322 may compare the predicted power flow of the influential path with a predetermined threshold to forecast congestion for a given period of time. In some embodiments, the evaluation module may send results of the comparison of the predicted power flow of the influential path and the predetermined threshold to pro-active congestion prediction report generating module 324.

In some embodiments, the pro-active congestion prediction report generating module 324 generates a congestion prediction report to assist in controlling, reducing, and/or avoiding future possible network congestion. It will be appreciated that mitigating network congestion by providing assets, configuring assets, and providing power flow controls to avoid the possibility of network congestion assists. Further, the congestion prediction report and/or mitigating efforts assist to identify network congestion, damages to assets, power failure, and/or reduced availability of power which may save lives of those that depend upon it (e.g., hospitals, the elderly, and/or the young).

There are several courses of action that can be taken by the power systems (e.g., depending on how much advance the warning of congestion can be made). Actions include, but are not limited to:

(1) (Shorter term) Demand response;
(2) (Mid-term) Changing the tap settings of the phase-shifting transformers to redistribute power in the circuit;
(3) (1-2 day ahead) Generator redispatch;
(4) Driving the value signals in various market based systems; and/or
(5) (Longer term) Enhancing circuit capacity during system expansion.

Figure 4A:
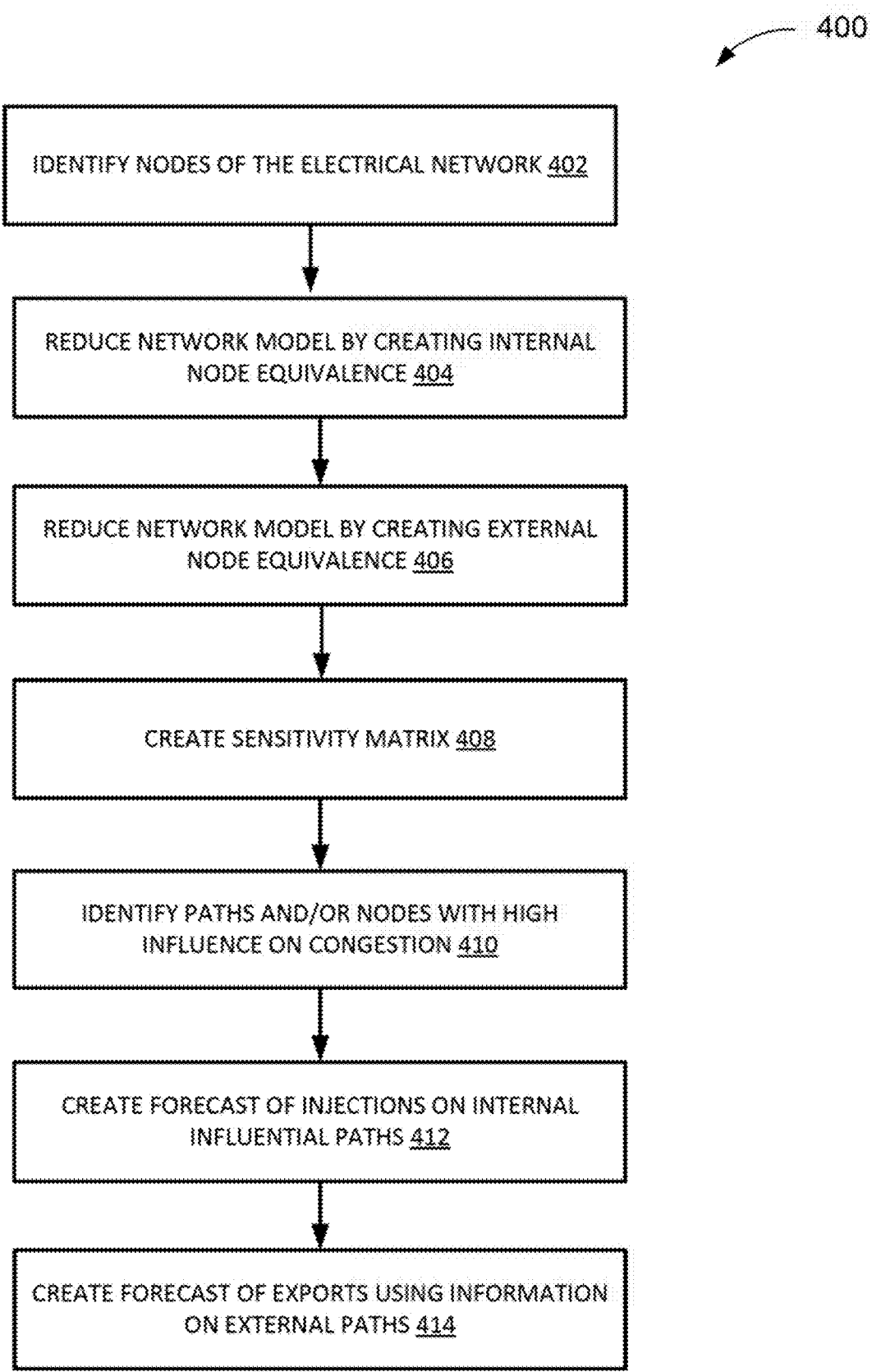
FIG. 4A depicts method of the congestion mitigation system according to some embodiments.

FIG. 4A depicts method 400 of the congestion mitigation system 204 according to some embodiments. Method 400 may be performed off-line (e.g., without network communication), online, or a combination of both.

In step 402, the grid topology module 306 identifies nodes (e.g., electrical assets or combination of electrical assets) of the electrical network 202. In one example, each of the components of the electrical network 202 in FIG. 2 is represented in a grid topology as a node. The connection between these nodes are represented in the grid topology as branches. As discussed herein, the grid topology module 306 may receive all or part of the topology from the power system 206. The grid topology module 306 may convert the topology to a different topology and/or select a portion of the electrical grid as a region of interest.

In some embodiments, the grid topology module 306 utilizes logs, sensor data, and any other information to generate the topology without first receiving a topology from another source.

In step 404, the equivalence module 308 may reduce the dimensionality of the grid topology outputted by the grid topology module 306 using methods of dimensional reduction. Nodes internal to the region of interest of the electrical network, or internal to a subset of the electrical network may be reduced. In some embodiments, the grid topology module 306 and/or the equivalence module 308 may model closing all closed circuit breakers and opening all open buses and the like for the gird and then create equivalent circuits and/or nodes for portions of the region of interest. In some embodiments, the equivalence module 308 is omitted, and the grid topology module 306 reduces the dimensionality of the grid topology by creating internal equivalences.

In step 406, the equivalence module 308 may determine equivalents of nodes external to regions of interest of the electrical network to further reduce the grid topology and simplify the network. Nodes external to the electrical network may be reduced according to the directional placement of the nodes. It will be appreciated that the complexity of parts of the regions of interest may be simplified by using regions of interest in order to improve scalability and computational efficiency for determining paths of interest (discussed further here) as well as for creating forecasts using the network congestion model.

In step 408, the sensitivity matrix generating module 310 generates the influential sensitivity matrix. In various embodiments, the sensitivity matrix generation module 310 generates the sensitivity matrix using the reduced topology from the grid topology module 306 and equivalents from the equivalents module 308. Generation of the sensitivity matrix if further described regarding FIG. 6.

In step 410, influential path module 312 determines paths and/or nodes of the electrical network 202 which has a high influence on congestion using the sensitivity matrix. In some embodiments, the influential path module 312 may be configured to utilize a sorted and/or ranked influential sensitivity matrix. Determination of the paths and/or nodes of the electrical network 20-2 that have a high influence on congestion using the sensitivity matrix is further described regarding FIG. 7.

In step 412, the congestion prediction module 316 forecasts power injections on internal paths and/or nodes in the electrical network 202. To test prediction validity and/or accuracy, the congestion prediction module 316 may utilize historical information and/or any other information to forecast power injections of internal influential nodes. In various embodiments, the congestion prediction module 316 forecasts power injections on internal paths and/or nodes in the electrical network 202 using real-time information and/or weather forecasts of renewable energy sources.

In step 414, the congestion prediction module 316 forecasts power injections on external paths and/or nodes in the electrical network 202. In various embodiments, the congestion prediction module 316 forecasts power injections on external paths and/or nodes in the electrical network 202 using real-time information and/or weather forecasts of renewable energy sources.

Figure 4B:
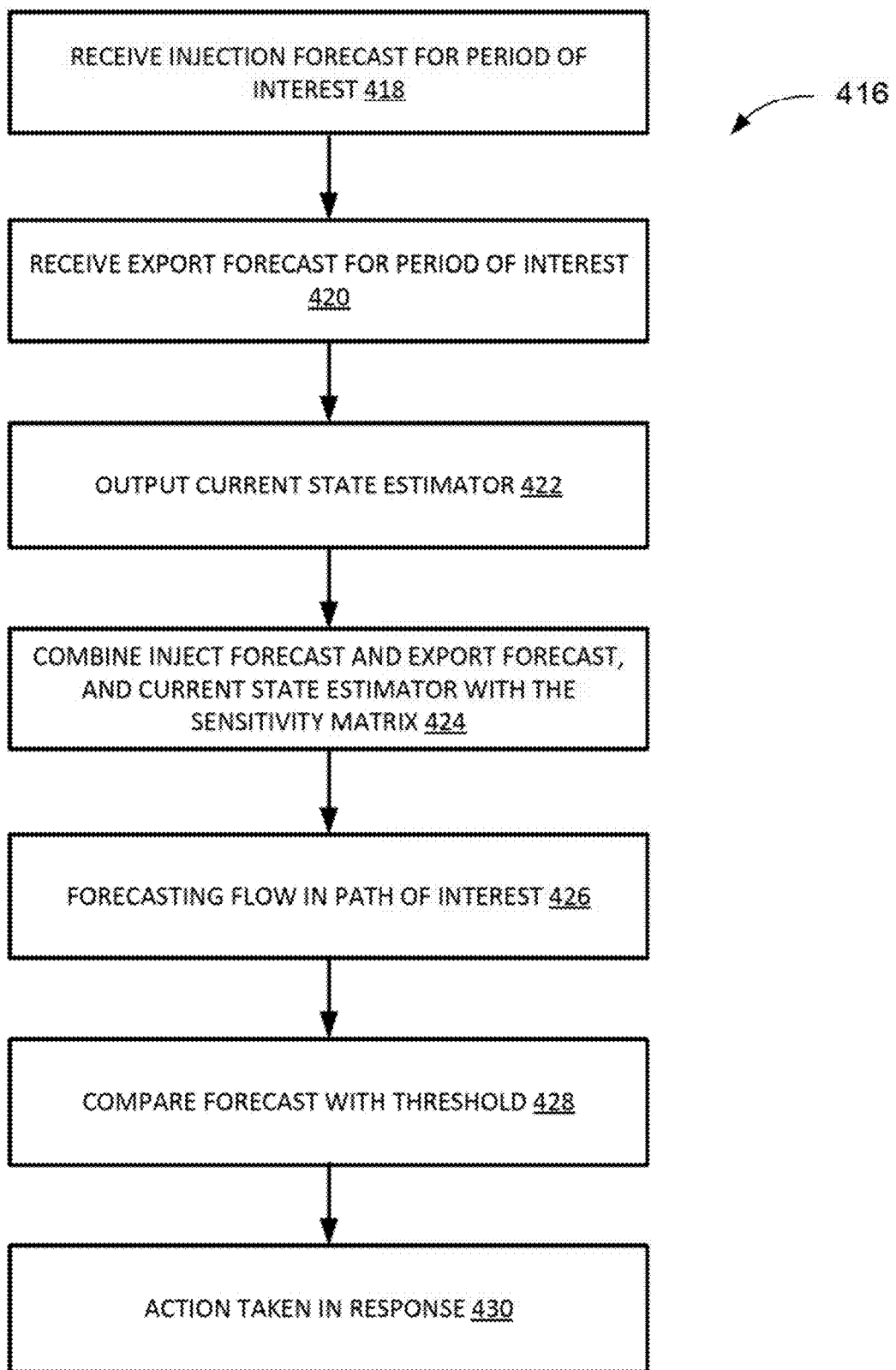
FIG. 4B depicts a method of the congestion mitigation system according to some embodiments

FIG. 4B depicts a method 416 of the congestion mitigation system 204 according to some embodiments. It will be appreciated that one or more steps may be performed off-line (e.g., without network communication), online, or a combination of both.

In step 418, the power forecast module 318 determines or receives a short-term forecast of the power injection for each internal node and/or path in the influential path into the electrical network 202. In some embodiments, a period of interest is identified by a user, power system 204, and/or the like. The short-term forecast of the power injection may be a factor of real-time data and/or historical data of the power injection into the electrical network 202 by each node and/or path of the influential path, the short-term weather forecast, schedule of upcoming component maintenance of each node of the influential path and the like.

In step 420, the power forecast module 318 determines a short-term forecast of power export to external nodes, external paths, external node equivalence, and/or external path equivalence. The short-term forecast of power export may be a factor of the real time data and/or historical data of the power export into any given external node and/or path or external node equivalence. It will be appreciated that the same period of interest as utilized in view of step 418 may be utilized.

In step 422, the power forecast module 318 determines the current state of the region of interest (e.g., the reduced, simplified region of interest including equivalents and the like). It will be appreciated that many power companies have installed state estimators, as a part of Energy Management Systems (EMS) suite. These state estimators use the information of electrical network topology and measurements of power system state variables (e.g., current, voltages, power injections and phase angles) from a few locations of the network, to estimate the 'state' or the values of the state variables for the rest of the network (which may not be directly measured). This helps companies monitor if a network is behaving abnormally (e.g., if any of the state variables, such as voltage, at different nodes are exceeding desired thresholds, and hence a control action needs to be taken). In one example, the state estimation may provide an operator a 'situational awareness' of the electrical network.

In various embodiments, the power forecast module 318 may determine a current state of a region of interest by receiving the state(s) from the power systems (e.g., from their related EMS suites). Although the information from state estimators as of today is mostly used to directly monitor and mitigate abnormalities in the values of certain variables, this information may be valuable to make estimations and forecasts of what might happen in the near future (congestion, for instance) inside the network.

In various embodiments, the power forecast module 318 may determine the current state based on real time information from any number of sensors in the regions of interest of the electrical grid and/or information from the power system 204. In some embodiments, the evaluation module 322 determines the current state of each node and/or path of the influential path of the electrical network 202.

In some embodiments, an amount of power being exchanged to-or-from external areas are forecasted separately if enough historical data is available, or in case only partial information of interest is available, either market-based forecasts or probability distributions of time-series power data may be used. The use of probability distribution for power injection also enables the algorithm to ingest the power injections from the renewable generation sources.

In some embodiments, when historical time series data is not available for node injection, a nominal (or average value) of injection at that node may be utilized for doing simulations related to power system studies. Nominal loading may be increased by a percentage (e.g., up to 100%) for simulating the "worst-case scenario." Alternately, the power forecast module 318 may simulate a distribution of the injection between the nominal, worst-case and minimal scenarios. Different types of parametric distributions may be developed to simulate a variety of system conditions. In some embodiments, the system conditions may be provided by the power system(s) (e.g., from knowledge of system experts, operators, and study engineers).

The estimated or measured power injections at the influential buses are combined using a linearized sensitivity matrix to predict the power flowing through, and hence, the probability of congestion in the path of interest. In some embodiments, the latter algorithm is computationally efficient since the linearized sensitivity matrix needs to be recomputed and inverted only when the topology of the network changes, otherwise it is a constant and the entire operation is reduced to a constant matrix being multiplied by injections at various influential nodes.

In step 424, the power forecast module 318 may apply the data associated with the current state, the data associated with the short-term forecast of power export of external node equivalences and data associated with the short-term forecast of the power injection for each node and/or path in the influential path of the electrical network 202 to the linearized sensitivity matrix (e.g., the portion of the sensitivity matrix associated with the most influential paths) to forecast flow in the path(s) of interest in step 426.

In step 428, the evaluation module 322 compares the predicted power flow of the influential path with one or more predetermined threshold(s) to forecast congestion for a given period of time. In some embodiments, the predetermined threshold is provided by the power system 206. In some embodiments, the evaluation module may send the results of the comparison of the predicted power flow of the influential path and the predetermine threshold to the pro-active congestion prediction report generating module 324. Examples of predetermined thresholds include, but are not limited to, available transfer capacity and/or safe operation limits.

In step 430, the pro-active congestion prediction report generating module 324 generates a congestion prediction report to enable control of power to reduce network congestion, shunting of power to areas of the electrical grid to support power flow and meet demand to reduce or eliminate network congestion, and/or apply extra equipment and/or resources (e.g., temporarily while the problem is forecasted to last) to aspects of the electrical network to correct the expected congestion.

Figure 5:
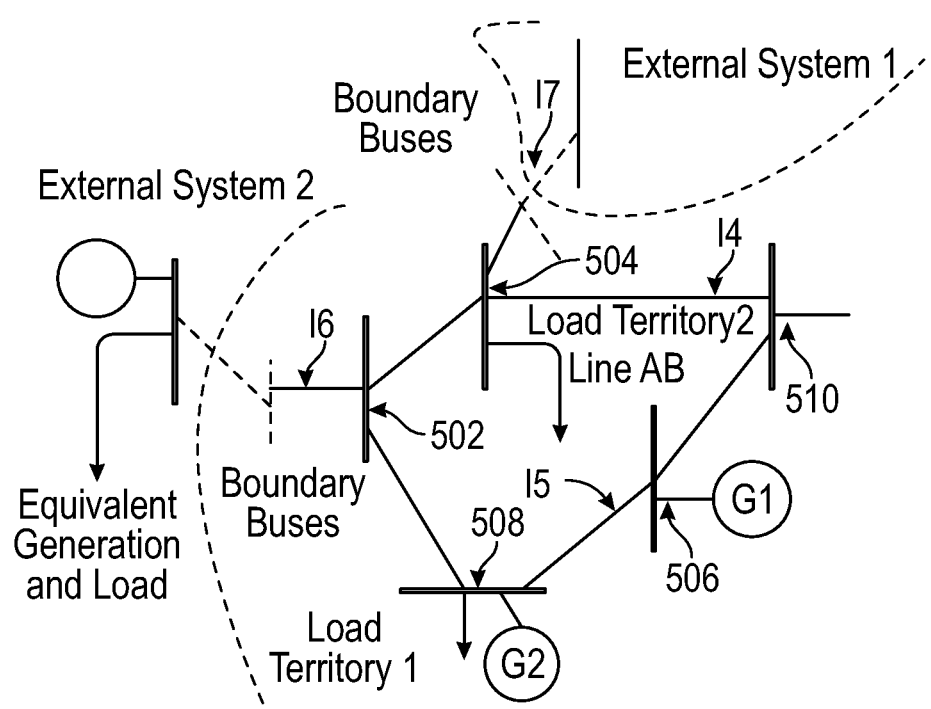
FIG. 5 depicts a diagram of an electrical network, illustrating an example of nodes internal and external to the electrical network according to some embodiments.

FIG. 5 depicts a diagram of an electrical network 500, illustrating an example of nodes internal and external to the electrical network according to some embodiments. Each of internal nodes 502, 504, 506, 508 and 510 and external nodes E1, E2, and E3 may represent one element of one of the components of the electrical network 202. Branch I1 connects internal node 502 to internal node 508. Branch I2 connects internal node 502 to internal node 504. Branch I3 connects internal node 506 to internal node 510 Branch I4 connects internal node 504 to internal node 510. Branch I5 connects internal node 508 to internal node 506. Branch I6 connects internal node 502 to external node E2. Branch I7 connects internal node 504 to external node E1.

FIG. 6 depicts power flows associated with a particular node of a region of interest of an electrical grid for discussing the sensitivity matrix in some embodiments. The sensitivity matrix is a factor of the impedance of the nodes of the ROI of the electrical network 202.

In various embodiments, the electrical impedances of the transmission lines/or distribution circuits are provided by manufacturer of these conductors, since they depend on the type of material being used. In one example, these values are in form of per ohms per unit length. Hence, in this example, the net impedance of a conductor between two nodes A and B, is the impedance per unit length, multiplied by the length of the wires between these nodes.

The geographical distance between nodes A and B may be, in some embodiments, linearly related with the length of the wire between them, and hence, the net impedance. In one example, if there are n parallel wires running between nodes A and B, the net impedance of the path (multiple wires) will be impedance of one wire divided by n.

The electrical distance between nodes A and B may be positively correlated (with a non-linear relationship, which can be linearized) with the impedance between nodes A and B, while it is inversely proportional to the number of wires in the path between A and B.

Basically, the electrical distance is an indication of coupling between two nodes, and in general if the electrical distance between two nodes is low, the sensitivity of injections in these nodes will be higher in all the path flows leading to/from these nodes.

The sensitivity matrix module 310 derives the sensitivity matrix which can subsequently be utilized for determining network buses which have influence on the flows in the path of interest.

The power injection at any node in the network can be written using Kirchoff's current law as, $$P_k = \Sigma_{j=1, j \neq k}^N P_{kj} \quad (1)$$

where $P_k$ is the power injection at the $k^{th}$ node, and $P_{kj}$ is the power flowing in the line between nodes k and node j. FIG. 6 depicts a representation of power injection at node k. Vectors $P_{k1}$ thru $P_{kN}$ represent power injection at node k. Vector $P_k$ represents the summation of vectors $P_{k1}$ thru $P_{kN}$ which represents the cumulative power injection at node k.

The power flow in each path can be further approximated as, the product of path impedance and the difference between the nodal voltage angles at the two ends of the path, for example, the power flow in the path between node k and node j may be represented as $$P_{kj} = B_{kj}(\theta_k - \theta_j) \quad (2)$$

Substituting (2) in (1), we get $$P_k = \Sigma_{j=1, j \neq k}^N B_{kj}(\theta_k - \theta_j) \quad (3)$$

Further, (3) can be written in matrix form as, $$P_{inj} = B\theta \quad (4)$$

where $P_{inj}$ is the vector of the nodal power injections, B is the system admittance matrix and $\theta$ is the vector of nodal phase angles. As a result, the nodal angles can be written in terms of the nodal power injections as:

$$\theta = B^{-1} P_{inj} \quad (5)$$

Putting (2) in matrix form, the vector of flows can be expressed as:

$$P_{flow} = B_{con}\theta \quad (6)$$

where each row in the vector $P_{flow}$ depicts line flows between two nodes (with directions), and the matrix $B_{con}$ is a sparse matrix where the non-zero elements depict the impedance (with signs) between two nodes represented in the row.

Substituting (5) in (6), $$P_{flow} = B_{con} B^{-1} P_{inj} \quad (7)$$

The relation (7) approximates the line flows in terms of nodal power injections and network topology. The product of the two matrices representing network information can be represented by a sensitivity matrix, $$B_{con} B^{-1} = S_{flow-inj} \quad (8)$$

The matrix $S_{flow-inj}$ is the sensitivity matrix, which is a linearized matrix. In some embodiments, the sensitivity matrix may only be calculated once for one topology. In some embodiments, each new power injection may require only a multiple of the sensitivity matrix $S_{flow-inj}$ with the change in the new power injection.

Since in real time the injections at a less sensitive influential bus might be in an order of magnitude higher than that of a more sensitive influential bus, the sensitive buses may be determined by ranking elements of the matrix:

$$S_{flow-inj} \Delta P_{inj} \quad (9)$$

FIG. 7 depicts an example structure of the sensitivity matrix 700, where $Path_x$ represents a particular line flow. The sensitivity matrix 700 depicts an example structure of a sensitivity matrix generated with respect to FIG. 6. For dimensionality reduction, the sensitivity matrix $S_{flow-inj}$ is linearized. In some embodiments, the sensitivity matrix is linearized once for one topology (e.g., one inverse). In various embodiments, each new injection may require only a multiplication of this matrix with injections (in contract, other AC-power flow methods recalculate the $B_{con} B^{-1}$ at every step (both inversion and multiplication)).

System dimension may be reduced for monitoring specific path flows. For example, it is observed that for large electrical networks (e.g., order 1000 buses or higher), less than 1% buses effect flows in specific paths of the network. Dimensions of the electrical network can be reduced by using a reduced set of (most sensitive and influential) node injections.

A reduced $S_{flow-inj}$ matrix may be created by retaining only the columns related to the most influential buses, while the others related to minimum, less, or no-influence may be removed. For example, after ranking the paths as shown in FIG. 7 and discussed with regard to FIG. 6, a limited number of paths may be selected based on rank. In some embodiments, a predetermined number of paths are selected. The number of paths to be selected may be based on a comparison of any number of paths to any other number of paths in the sensitivity matrix, based on a percentage of the total, based on the nature or critical aspects of the path in the electrical network, comparison of information within the sensitivity matrix to one or more thresholds, and/or any number of other factors.

In various embodiments, ranking is based on net sensitivity. In one example, ranking is based on a product of the estimated electrical sensitivity with the (measured, estimated, or forecasted) magnitude of the power injections at the internal and equivalent external nodes. In some embodiments, the top 10% node injections (including internal and external nodes) which have the highest estimated net sensitivities are identified as the highest ranked.

In various embodiments, individual nodal power injections $P_{inj}$ can be made to represent uncertainties (forecasting or otherwise), by using probability distributions instead of deterministic values. Since the matrix $S_{flow-inj}$ is linear, the flow in the path may be computed analytically when the individual injections are parametric distributions. For example, the probability distribution of the $r^{th}$ injection is may be:

$$P_r \sim p(x;\phi_r) \qquad (11)$$

where $\phi_r$ is the vector of parameters describing the distributions of $P_r$. The Probability distribution of the flow in the path j may be analytically computed directly by the equation:

$$Path_j = \Sigma_{i=1}^n s_{ji} p(x;\phi_i) \qquad (12)$$

where $s_{ji}$ is the sensitivity of the path flow j to injection i.

In some embodiments, accurate forecasts of the constituent influential bus injections may be developed by training machine-learning models on the historical (measured) power injection data and accurate weather forecasts.

In some embodiments, machine learning models (e.g., random forests, support vector machines (SVR), regularized regression, and/or the like), complemented with statistical models (e.g., generalized multilinear regression or vector auto-regression) may be built to estimate a relationship between the historical power injections and the short listed weather features. Using these models, power injections may be forecasted at various nodes in the system with a certain confidence bound, given the forecasts of the interesting features from an accurate weather forecasting system. Once the injections are known, the flows (and hence congestion) can be forecasted for any given time interval (e.g., in the near future such as 24-48 hours) with a certain level of accuracy. In various embodiments, an early warning system may be created for path congestions, based on the latter forecasts.

In contrast, AC power-flow type methods must rely on Monte Carlo sampling methods. Being able to directly compute distributions instead of performing Monte Carlo simulations drastically reduces the computational complexity of computing distributions of flows.

Figure 8:
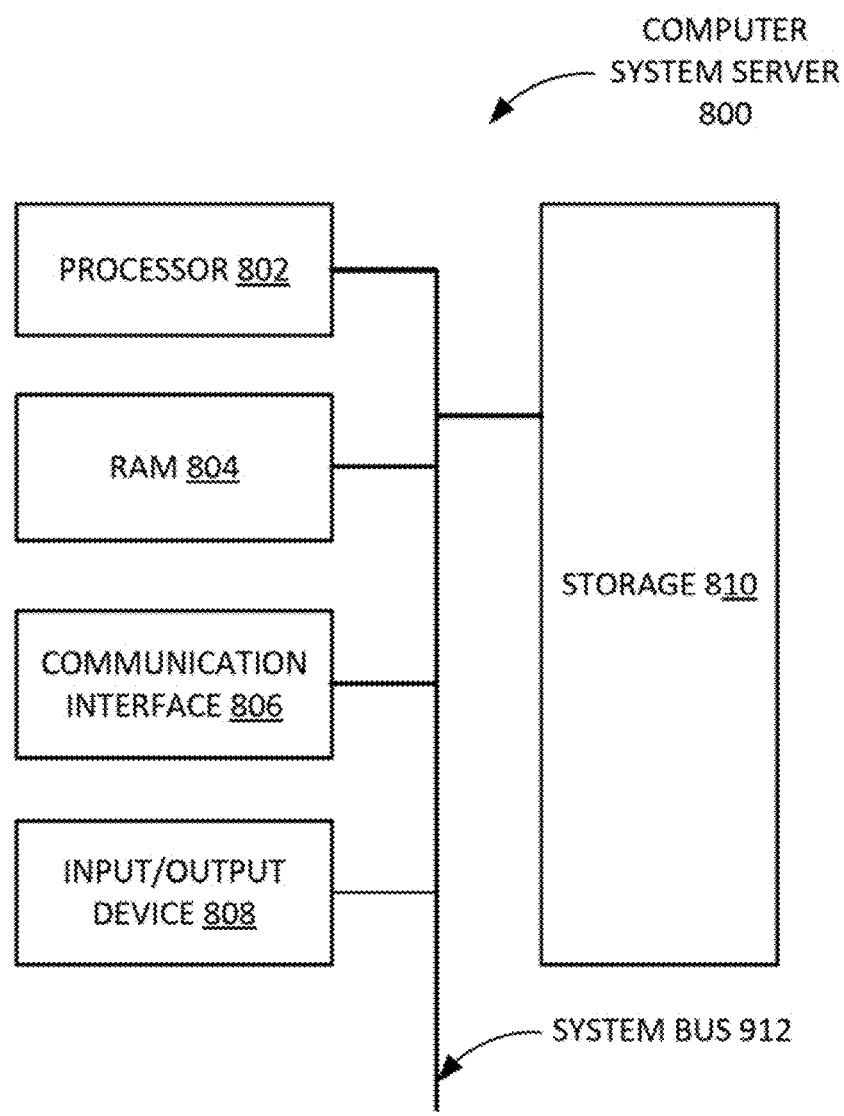
FIG. 8 depicts a block diagram of an example computer system server according to some embodiments.

FIG. 8 depicts a block diagram of an example computer system server 800 according to some embodiments. Computer system server 800 is shown in the form of a general-purpose computing device. Computer system server 800 includes processor 802, RAM 804, communication interface 806, input/output device 808, storage 810, and a system bus 812 that couples various system components including storage 810 to processor 802.

System bus 812 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 800 typically includes a variety of computer system readable media. Such media may be any available media that is accessible by congestion mitigation system 804 and it includes both volatile and nonvolatile media, removable and non-removable media.

In some embodiments, processor 802 is configured to execute executable instructions (e.g., programs). In some embodiments, the processor 1004 comprises circuitry or any processor capable of processing the executable instructions.

In some embodiments, RAM 804 stores data. In various embodiments, working data is stored within RAM 806. The data within RAM 806 may be cleared or ultimately transferred to storage 810.

In some embodiments, communication interface 806 is coupled to a network via communication interface 806. Such communication can occur via Input/Output (I/O) device 808. Still yet, congestion mitigation system 804 can communicate with one or more networks such as a local area network (LAN), a general wide area network (WAN), and/or a public network (e.g., the Internet).

In some embodiments, input/output device 808 is any device that inputs data (e.g., mouse, keyboard, stylus) or outputs data (e.g., speaker, display, virtual reality headset).

In some embodiments, storage 810 can include computer system readable media in the form of volatile memory, such as read only memory (ROM) and/or cache memory. Storage 810 may further include other removable/non-removable, volatile/non-volatile computer system storage media. By way of example only, storage 810 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 812 by one or more data media interfaces. As will be further depicted and described below, storage 810 may include at least one program product having a set (e.g., at least one) of program modules that are configured to carry out the functions of embodiments of the invention. In some embodiments, RAM 804 is found within storage 810.

Program/utility, having a set (at least one) of program modules, such as congestion mitigation system 804, may be stored in storage 810 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with congestion mitigation system 804. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A nontransitory computer readable medium comprising instructions executable by a processor, the instructions being executable to perform a method, the method comprising:

receiving an initial topology of electrical network of electrical assets, the electrical network for receiving and providing electrical power to infrastructure;

receiving a selection of a region of interest of the initial topology of the electrical network of electrical assets;

determining one or more external equivalents of two or more electrical assets of the initial topology of the electrical network that are external to the region of interest;

determining one or more internal equivalents of two or more electrical assets of the initial topology of the electrical network that are internal to the region of interest;

calculating a sensitivity matrix based on electrical impedances of at least one of the one or more internal equivalents within the region of interest and based on an amount of power exchanged by the one or more internal equivalents within the region of interest when in operation;

determining a subset of the sensitivity matrix as indicating highly sensitive buses, each of the highly sensitive buses in the region of interest being sensitive to power flow in comparison with other nodes in the sensitivity matrix;

receiving historical data regarding power flows of any number of nodes of the region of interest;

receiving a weather prediction associated with a geographic area that includes renewable energy sources;

predicting power injections for each highly sensitive bus based on the received weather prediction;

predicting power flow for each highly sensitive bus based on the historical data and the predicted power injections related to the weather prediction, wherein the power injection for highly sensitive bus is predicted using machine learning models and statistical models to estimate a relationship between historical power injections and weather features;

comparing the predicted power flow for each of the highly sensitive buses to at least one predetermined threshold to determine possible network congestion; and generating a report regarding network congestion and locations of possible network congestion in the region of interest based on the comparison.

2. The nontransitory computer readable medium of claim 1, the method further comprising receiving historical data regarding power flows of any number of the one or more external equivalents external to the region of interest and wherein predicting power flow for each of the highly sensitive buses is further based on power injections associated with the one or more external equivalents that are predicted based on the historical data regarding power flows of the any number of the one or more external equivalents.

3. The nontransitory computer readable medium of claim 1, wherein the sensitivity matrix produces linear coefficients.

4. The nontransitory computer readable medium of claim 1, wherein the sensitivity matrix is linearized once for one topology of the region of interest.

5. The nontransitory computer readable medium of claim 1, wherein each new predicted power injection requires a multiplication of the sensitivity matrix with the predicted power injection and not an inversion.

6. The nontransitory computer readable medium of claim 1, wherein the sensitivity matrix is inverted upon a change of topology of the region of interest.

7. The nontransitory computer readable medium of claim 1, the method further comprising simplifying the topology of the region of interest by closing circuit breakers in the topology.

8. The nontransitory computer readable medium of claim 1, wherein calculating the sensitivity matrix based on the electrical impedances of at least one of the one or more internal equivalents within the region of interest comprises calculating electrical distance between the at least one of the one or more internal equivalents within the region of interest to a source of power injection.

9. The nontransitory computer readable medium of claim 1, wherein calculating the sensitivity matrix is also based on electrical impedances of at least one node within the region of interest, the node representing an asset of the region of interest in the electrical network.

10. A system comprising:
one or more processors; and
memory, the memory comprising instructions to configure the one or more processors to perform a method, the method comprising:

receiving an initial topology of electrical network of electrical assets, the electrical network for receiving and providing electrical power to infrastructure;

receiving a selection of a region of interest of the initial topology of the electrical network of electrical assets;

determining one or more external equivalents of two or more electrical assets of the initial topology of the electrical network that are external to the region of interest;

determining one or more internal equivalents of two or more electrical assets of the initial topology of the electrical network that are internal to the region of interest;

calculating a sensitivity matrix based on electrical impedances of at least one of the one or more internal equivalents within the region of interest and based on an amount of power exchanged by the one or more internal equivalents within the region of interest when in operation;

determining a subset of the sensitivity matrix as indicating highly sensitive buses, each of the highly sensitive buses in the region of interest being sensitive to power flow in comparison with other nodes in the sensitivity matrix;

receiving historical data regarding power flows of any number of nodes of the region of interest;

receiving a weather prediction associated with a geographic area that includes renewable energy sources;

predicting power injections for each highly sensitive buses based on the received weather prediction;

predicting power flow for each highly sensitive buses based on the historical data and the predicted power injections related to the weather prediction, wherein the power injection for each highly sensitive bus is predicted using machine learning models and statistical models to estimate a relationship between historical power injections and weather features;

comparing the predicted power flow for each of the highly sensitive buses to at least one predetermined threshold to determine possible network congestion; and generating a report regarding network congestion and locations of possible network congestion in the region of interest based on the comparison.

11. The system of claim 10, the method further comprising receiving historical data regarding power flows of any number of the one or more external equivalents external to the region of interest and wherein predicting power flow for each of the highly sensitive buses is further based on power injections associated with the one or more external equivalents that are predicted based on the historical data regarding power flows of the any number of the one or more external equivalents.

12. The system of claim 10, wherein the sensitivity matrix produces linear coefficients.

13. The system of claim 10, wherein the sensitivity matrix is linearized once for one topology of the region of interest.

14. The system of claim 10, wherein each new predicted power injection requires a multiplication of the sensitivity matrix with the predicted power injection and not an inversion.

15. The system of claim 10, wherein the sensitivity matrix is inverted upon a change of topology of the region of interest.

16. The system of claim 10, the method further comprising simplifying the topology of the region of interest by closing circuit breakers in the topology.

17. The system of claim 10, wherein calculating the sensitivity matrix based on the electrical impedances of at least one of the one or more internal equivalents within the region of interest comprises calculating electrical distance between the at least one of the one or more internal equivalents within the region of interest to a source of power injection.

18. The system of claim 10, wherein calculating the sensitivity matrix is also based on electrical impedances of at least one node within the region of interest, the node representing an asset of the region of interest in the electrical network.

19. A method comprising:
- receiving an initial topology of electrical network of electrical assets, the electrical network for receiving and providing electrical power to infrastructure;
- receiving a selection of a region of interest of the initial topology of the electrical network of electrical assets;
- determining one or more external equivalents of two or more electrical assets of the initial topology of the electrical network that are external to the region of interest;
- determining one or more internal equivalents of two or more electrical assets of the initial topology of the electrical network that are internal to the region of interest;
- calculating a sensitivity matrix based on electrical impedances of at least one of the one or more internal equivalents within the region of interest and based on an amount of power exchanged by the one or more internal equivalents within the region of interest when in operation;
- determining a subset of the sensitivity matrix as indicating highly sensitive buses, each of the highly sensitive buses in the region of interest being sensitive to power flow in comparison with other nodes in the sensitivity matrix;
- receiving historical data regarding power flows of any number of nodes of the region of interest;
- receiving a weather prediction associated with a geographic area that includes renewable energy sources;
- predicting power injections for each highly sensitive bus based on the received weather prediction;
- predicting power flow for each highly sensitive bus based on the historical data and the predicted power injections related to the weather prediction, wherein the power injection for highly sensitive bus is predicted using machine learning models and statistical models to estimate a relationship between historical power injections and weather features;
- comparing the predicted power flow for each of the highly sensitive buses to at least one predetermined threshold to determine possible network congestion; and
- generating a report regarding network congestion and locations of possible network congestion in the region of interest based on the comparison.

* * * * *